United States Patent
Zhao et al.

(10) Patent No.: US 8,922,673 B2
(45) Date of Patent: Dec. 30, 2014

(54) COLOR CORRECTION OF DIGITAL COLOR IMAGE

(75) Inventors: Yonghui Zhao, Penfield, NY (US); Shen-ge Wang, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 478 days.

(21) Appl. No.: 13/333,346

(22) Filed: Dec. 21, 2011

(65) Prior Publication Data
US 2013/0162862 A1  Jun. 27, 2013

(51) Int. Cl.
*H04N 9/73* (2006.01)
*H04N 5/76* (2006.01)

(52) U.S. Cl.
USPC .................................. 348/223.1; 348/231.99

(58) Field of Classification Search
CPC ..... H04N 5/772; H04N 9/735; H04N 1/6027; H04N 1/32128
See application file for complete search history.

(56) References Cited

U.S. PATENT DOCUMENTS

| 7,138,979 | B2 * | 11/2006 | Robin et al. | 345/158 |
| 7,724,296 | B2 * | 5/2010 | Lonn | 348/333.12 |
| 2010/0245617 | A1 * | 9/2010 | Shuster | 348/223.1 |
| 2012/0120186 | A1 * | 5/2012 | Diaz et al. | 348/36 |

* cited by examiner

*Primary Examiner* — Luong T Nguyen
(74) *Attorney, Agent, or Firm* — Fox Rothschild LLP (57) ABSTRACT

A software application corrects for luminance and/or color in a captured image on a device having two cameras. The first camera receives a reference image, and the second camera receives a target image. The device compares the reference image and a reference file retrieved from memory to identify one or more luminance or color differences, and it automatically actuates an optical adjustment element of the second imaging device in response to the differences. The second imaging device captures a target image, and the target image is stored in a computer-readable memory.

21 Claims, 4 Drawing Sheets

COLOR CORRECTION OF DIGITAL COLOR IMAGE

BACKGROUND

With the advent of modern digital photography, the simplicity of taking a high quality color photograph has never been easier. Even the most inexperienced of users are able to take excellent pictures without the need to manually adjust settings to ensure a proper picture. This is largely due in part to the ability of electronic devices to automatically adjust settings. Examples of such automatic adjustments include an automatic white balance setting and the automatic exposure setting.

White balance is the process of removing unnatural color casts, so that objects which are perceived as white by a person are rendered as white in an image captured by an imaging device such as a camera. Proper camera white balance has to take into account the "color temperature" of a light source, which refers to the relative warmth or coolness of white light. Human eyes are capable of automatically judging what is white under different light sources, but digital cameras often have great difficulty doing the same with auto white balance and can create unsightly blue, orange, or even green color casts.

Accordingly, there exists a need for a device that is capable of using a reference object in any lighting situation to properly and automatically adjust the white balance prior to taking the photograph.

SUMMARY

In some embodiments, a method of capturing a digital image includes operating an electronic device having first and second imaging devices so that the first imaging device receives a reference image, and the second imaging device receives a target image. A processor of the electronic device compares the reference image and a reference file to identify one or more differences, automatically actuates an optical adjustment element of the second imaging device in response to the differences, causes the second imaging device to capture a target image, and stores the target image in a computer-readable memory.

The reference image and the reference file may each include an image of a document containing a color component, an image of a human, or an image of any other reference object.

In an alternate embodiment, an electronic device having first and second imaging devices executes programming instructions that implement a method that includes accessing a reference file, causing the first imaging device to view a reference image of the reference object, identifying one or more differences between the reference image and the reference file, actuating the optical adjustment element based on the identified difference or differences, causing the second imaging device to capture a target image, and storing the target image in the computer-readable memory.

In either of the embodiments listed above, the identified differences may include a luminance difference. If so, the optical adjustment element that is actuated may include, for example, a shutter speed adjustment and/or a flash. In addition or alternatively, the identified differences may include a color difference. If so, the optical adjustment element may include instructions to perform a white balance setting process and a color transformation program that, when executed, causes the processor to apply color correction to the target image file.

In some embodiments, the electronic device may include a shutter release button, and the image capture application may be activated by manually pressing the shutter release button.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

For the purposes of this document, an "electronic device" refers to a device that includes two or more imaging components, a processor, and tangible, computer-readable memory. Additionally, the electronic device may optionally have a display, a speaker, and one or more vibrator motors for haptic feedback. The memory may contain programming instructions in the form of a software application that, when executed by the processor, causes the electronic device to perform one or more operations according to the programming instructions. Examples of suitable devices include portable electronic devices such as cameras, smartphones, personal digital assistants, tablet devices, electronic readers, personal computers, media players, satellite navigation devices, and the like.

An "imaging device" refers to any device capable of optically viewing an object and converting an interpretation of that object into electronic signals. One such example of an imaging device is a camera with a lens. Accordingly, a "camera" as described herein may be viewed as the equivalent of an "imaging device."

An "optical adjustment element" refers to any element adapted to adjust any number of settings that affect images that are captured by an imaging device. Examples of optical adjustment elements include a photoflash, a zoom lens, or software programming that enables digital zoom. The optical adjustment element may be controlled manually by a user, or may be controlled automatically by the processor. The settings may include, but are not limited to, aperture, color, illumination, ISO, shutter speed, exposure, flash activation and zoom. Adjustment of any optical adjustment element may result in a change in the imaged target object, such as change in color, luminance, and/or the like.

Figure 1:
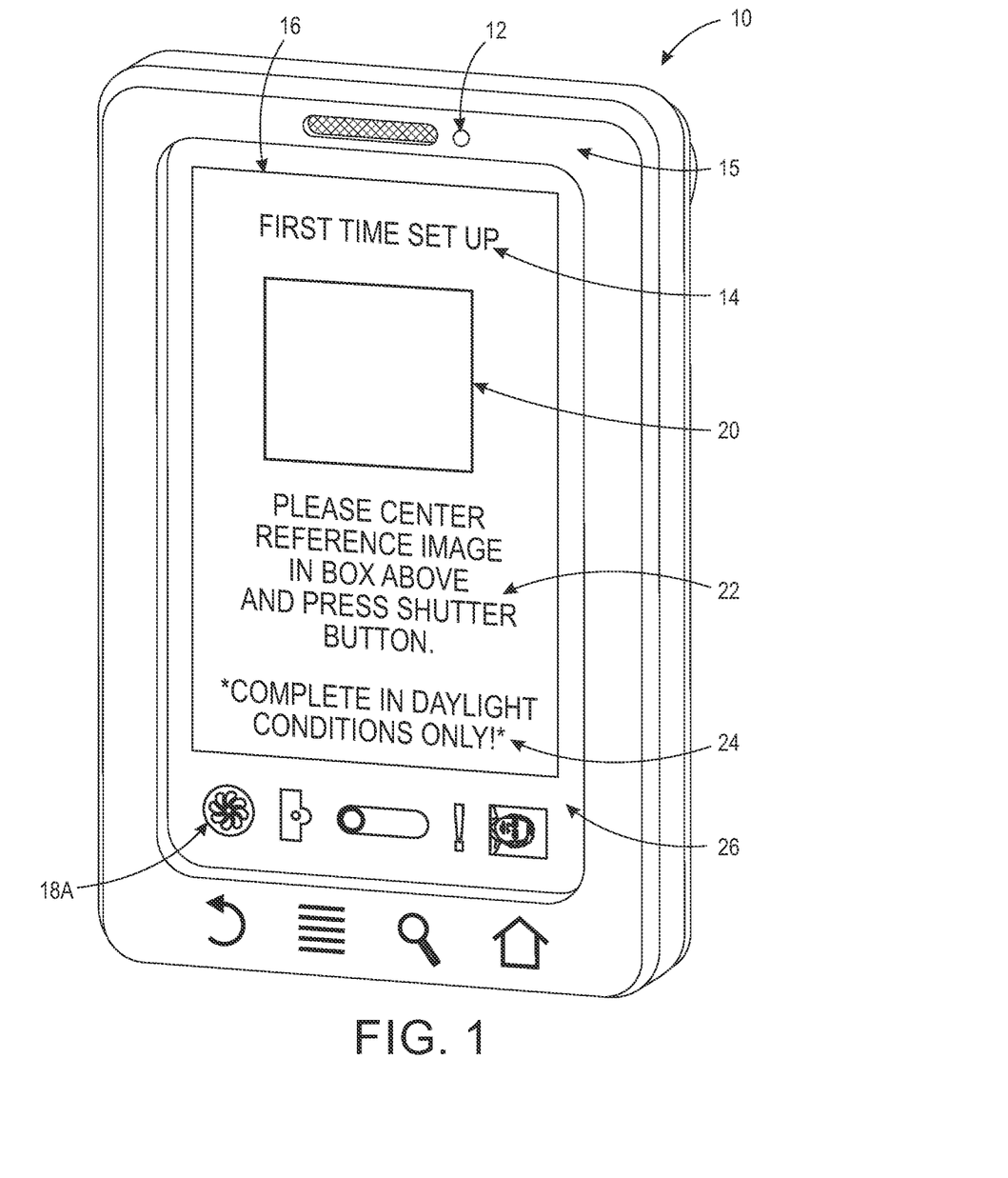
FIG. 1 illustrates a perspective view of a first front face of an electronic device that includes a color correction application in accordance with an embodiment of the present disclosure.

Referring to FIG. 1, an electronic device 10 may be used to execute an image capture application. The front face 15 of the electronic device 10 may include a display 16 and an opening through which the aperture for a front-facing camera 12 receives light. The front face may further have a camera shutter button 18a. Alternatively, the shutter button may be displayed on a touch-sensitive portion of the display 16 when the camera executes an imaging software application. The electronic device 10 may be held in such a way that the front face 15 faces the user operating the electronic device 10, so that the user is able to view the contents shown on the display 16 during operation, and so that the front-facing camera 12 is capable of viewing a reference object (such as the user's face) when the electronic device 10 is used in a manner as intended by this disclosure.

During a setup operation, a user may operate the front-facing camera 12 to capture an image from a reference object within its optical field. The reference object may be any object that may appear in the optical field of the front-facing camera 12 when the electronic device 10 is used in accordance with this disclosure. One such object may be the primary user's face, as it is conceivable that the primary user's face (or another user's face) will usually be present in the optical field of the front-facing camera 12 every time the electronic device 10 is used. However, the reference object could be another item such as the user's hand or other human body part; a driver's license, other identification card, or other document containing a color component such as a graphic printed on a substrate; an article of clothing; or any other item. The user may capture the image in a desirable illumination environment, such as a well-lit room or a sunny outdoor environment. Optionally, the device's display 16 or an audio output may output instructions that guide the user for a suitable illumination environment. As another option, the electronic device may include a sensor, such as a flash sensor, that senses illumination of the environment. The device may determine whether an output of the sensor falls within an illumination range. If the output falls within the range, the device may capture the image. If not, it may instruct the user to move to an area with a higher or lower illumination, depending on where the output fell with respect to the range.

After the image is captured and stored in the memory as a reference file, the front-facing camera 12 may switch to having a purpose of viewing any available reference object at, or substantially simultaneously with, the time a target image is captured so that the colors of the live image of the reference object at that point in time may be compared with the colors of the reference file stored in memory.

While the primary user's face may be depicted in the reference file stored in the memory, the image capture application may be adapted to utilize any user's face present in the view of the front facing camera 12 during subsequent operation of the electronic device 10, thus ensuring that the color correction as described herein is capable of functioning as intended.

The front-facing camera 12 may be controlled in any number of ways by the processor. For example, the front-facing camera 12 may be activated by the processor to obtain a view of an object within the optical field of the camera, which may then be displayed on the display 16 as a captured image, or as a real-time, live view representation of the object. The shutter button 18a may be configured to release a shutter in the front-facing camera 12 to capture the object in the optical field of the front-facing camera 12 and store it as an reference file to the memory. It may be appreciated that the front-facing camera 12 may have other means of capturing the object in the optical field that do not require the release of a shutter mechanism.

The front-facing camera 12 may be any type of imaging device, including, but not limited to, a video camera, a digital camera, a stereo camera, a web camera, or a device with an image sensor such as a CMOS or CCD sensor. The front-facing camera 12 may further incorporate various lenses, filters, and other optical devices such as zoom lenses, wide angle lenses, minors, prisms and the like to assist in capturing a desired image. The front-facing camera 12 may be fixed in a particular orientation and configuration, or it may be programmable in orientation or in one or more optical adjustment elements. Programming data for controlling the front-facing camera 12 may be contained in the memory for execution by the processor. The front-facing camera 12 may also be capable of moving or rotating along one or more axes or directions, and may further be capable of moving to follow or track an object in motion.

As briefly discussed above, the display 16 may be used to display an image or a live-view feed of the objects within the optical field of the front-facing camera 12. The display 16 may further be used to display images or live-view feeds of other cameras attached to the electronic device 10. Images, text, and the like may also be outputted for viewing on the display 16. For example, the processor may use the display 16 to show the application screen 26, which may include a first time set up text box 14 that alerts the user to capture an image of the reference object. This application screen 26 may further include a guide box 20 or other boundary indicator to assist the user in centering the image in the proper location of the front-facing camera's 12 optical field to ensure an accurate color measurement. The display 16 may further be utilized to display other instructions to assist the user, such as instructions to center the reference object and to press the shutter button 22 or a command to only complete the operation in daylight conditions 24. The display 16 may change the images, video, text, and the like based on commands received from the processor or commands received via user inputs.

The display 16 may be any suitable component capable of displaying images, video, and the like. Such components may include, but are not limited to, electroluminescent displays, electronic paper displays, vacuum fluorescent displays, light-emitting diode (LED) displays, cathode ray tube (CRT) displays, liquid crystal displays (LCD), plasma display panels, digital light processing (DLP) displays, and organic light-emitting diode (OLED) displays. The display 16 may further include a touch sensitive screen, including, but not limited to, resistive touchscreens, capacitive touchscreens, infrared touchscreens and the like, as well as combinations thereof.

As described above, the camera shutter button 18a may be used to trigger a shutter action or other similar action on the front-facing camera 12. The camera shutter button 18a may be additionally configured to provide a series of other commands as well, such as triggering shutters or other image capture actions on additional cameras. The camera shutter button 18a may be controlled by any number of tactile gestures, including, but not limited to, tapping, pressing, sliding or pinching.

Figure 2:
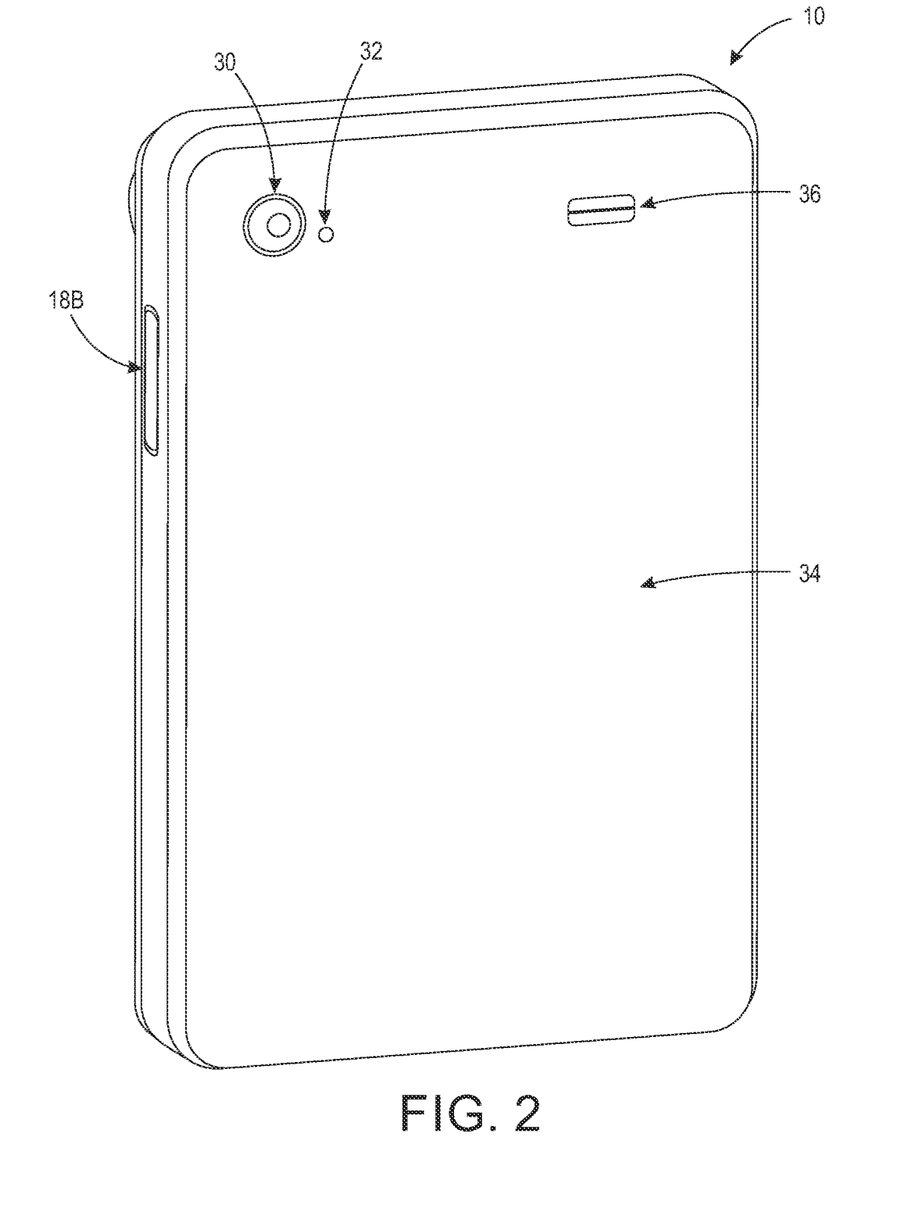
FIG. 2 illustrates a perspective view of a second rear face of an electronic device that includes a color correction application in accordance with an embodiment of the present disclosure.

Persons skilled in the art will recognize that the camera shutter button 18a may be located upon any face of the electronic device 10, or may be detached from the electronic device 10 and capable of communicating with the electronic device 10 via a wired connection such as a USB cable or optical cable, or via a wireless connection such as Bluetooth, near field communication, or Wi-Fi. The camera shutter button 18a may further be an electronically generated, non-physical button displayed on the display 16 (as shown), or may be a physical button 18b (as shown in FIG. 2). The electronic device 10 may also include both buttons 18a, 18b, both of which may be configured to be used interchangeably to perform the same functions.

The image capture application may be stored within the memory of the electronic device 10, and may contain programming instructions for the processor to execute a series of steps. Such steps may include accessing files stored in the memory, such as reference files, directing the cameras to view and/or capture images, adjusting optical adjustment elements, storing files to memory, and the like.

FIG. 2 shows a rear face 34 of the electronic device 10. The rear face 34 may include an opening through which the aperture for a rear-facing camera 30 receives light, as well as an aperture through which a flash 32 may emit light. The rear face, front face or any other portion of the camera may include an optional audio input and/or output 36 such as a speaker, microphone and/or audio port. The rear face 34 may be positioned in such a manner that the rear-facing camera 30 is aimed at a target object of which the user desires to capture an image.

The rear-facing camera 30 may be directed by the processor to complete any number of camera or imaging related tasks, including, but not limited to, focusing on an object, panning, tilting, zooming, recording video or capturing images. As envisioned by the present disclosure, the rear-facing camera 30 may be positioned before a target object, may receive instructions from the processor to adjust certain settings such as exposure, illuminant (such as natural light, indoor light, flash, and the like), shutter speed, ISO, aperture and the like, and may capture an image. The processor may be adapted to then direct the captured image to be stored in memory.

The rear-facing camera 30 may be activated by the processor to obtain a view of an object within the optical field of the camera, which may then be displayed on the display 16 as a captured image, or as a real-time, live view representation of the object. The rear-facing camera 30 may also be configured to receive a command from either shutter button 18a, 18b to signal when an image is to be captured. The command may come directly from the buttons 18a, 18b or may be transmitted through the processor before it is sent to the rear-facing camera 30. Additionally, the processor may automatically command the rear-facing camera 30 to capture an image without input from the shutter buttons 18a, 18b. Alternatively, the processor may be programmed to actuate the front-facing camera and/or the rear facing camera in response to a voice prompt that is received via an audio input/output 36.

As with the front-facing camera 12 described above, the rear-facing camera 30 may be any type of camera, including, but not limited to, a video camera, a digital camera, a stereo camera, a web camera, or a device with an image sensor such as a CMOS or CCD sensor. The rear-facing camera 30 may further incorporate various optical adjustment elements to assist in capturing a desired image. The rear-facing camera 30 may be fixed in a particular orientation and configuration, or it may be programmable in orientation, light sensitivity level, focus or other parameters. Programming data for controlling the rear-facing camera 30 may be contained in the memory for execution by the processor. The rear-facing camera 30 may also be capable of moving or rotating along one or more axes or directions, and may further be capable of moving to follow or track an object in motion.

The flash 32 may be utilized in any light conditions as one such optical adjustment element to assist the rear-facing camera 30 in completing any of the tasks described above. Additionally, the flash 32 may be independently activated by the processor to turn on or off at specific points in time, such as when additional lighting is necessary to capture an ideal image according to the present disclosure. The processor may further control other features of the flash 32, such as dimming, strobe, constant on, and the like. Adjustment of the flash 32 may result in changes to luminance and color of the target image received by the rear-facing camera 30.

The flash 32 may be any suitable light source capable of providing illumination, including, but not limited to, magnesium-based flashes, xenon-based flashes, fulminate-containing flashes, light-emitting diode (LED) flashes, and the like. The flash 32 may further emit a light at any color temperature suitable for illuminating images for photographic purposes. While the present figure depicts the flash 32 as being integrated with the electronic device 10, it may be appreciated that the flash 32 may be a separate component communicating with the electronic device 10, such as USB based flashes, hot shoe based flashes, remote slave flash units, or other similar devices.

The optional audio input/output 36 may be adapted to play audio tones and signals, if so directed by the processor. Such audio tones and signals may be used to instruct the user to complete various steps as described herein, and may further indicate to the user that a picture has been taken by emitting a beep, click, or other audio signal.

The speaker may be any electroacoustic transducer capable of producing sound in response to an electrical audio signal input. The speaker may include, but is not limited to, any number of drivers such as subwoofers, woofers, mid-range speakers, tweeters, supertweeters, and any combinations thereof.

Accordingly, the configuration of the electronic device 10 as shown in FIGS. 1 and 2 is only an illustrative example, and persons skilled in the art will appreciate other configurations that are able to achieve a similar overall result.

Figure 3:
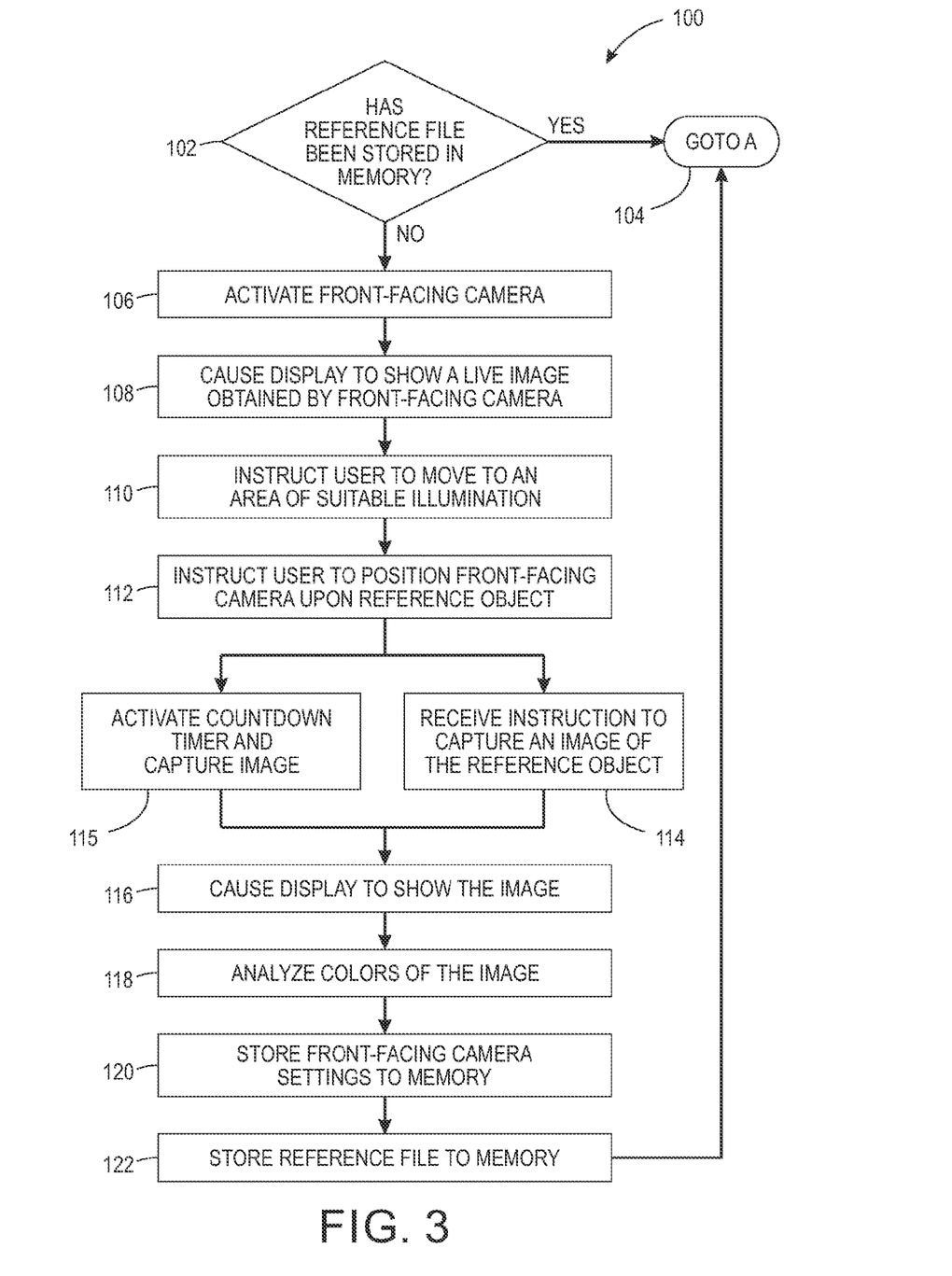
FIG. 3 is a flow chart example of a process for obtaining a reference file according to an embodiment of the present disclosure.

A process of obtaining a reference file is depicted in FIG. 3, generally designated 100. This process may be stored as a software application within the memory, and the steps outlined below may be executed by the processor in conjunction with other components. A first step may be to determine whether a reference file has previously been obtained, and whether it has been stored in the memory 102. If a reference file is currently stored in memory, the process may bypass the reference-obtaining steps 104 and proceed directly to the process for obtaining a color corrected image (as later described in FIG. 4). If a reference file has not already been obtained and stored in memory, the process may direct the processor to activate the front facing camera 106 and output a live image of the front-facing camera's optical field on the display 108. The user may be instructed to move into an area where the lighting is natural daylight or otherwise sufficiently illuminated 110 and may further be instructed to position the front-facing camera's optical field before a reference object 112, such as the user's own face. Once the tasks have been completed, the user may then receive an instruction to actuate the front facing camera to capture the image of the reference object 114. The instruction may be received when a user actuates a shutter button, when a user issues a voice command or automatically in response to the occurrence of an event such as an elapsed time condition or the detection of a recognized reference object using any suitable image recognition technology. For example, the display may show or the device may actuate a countdown timer 115, or an audio timer signal may be played. At the end of the countdown, the processor may implement instructions that cause the front-facing camera to automatically capture the image 116. The image may then be shown on the display 116 while the processor implements programming instructions to analyze the colors of the image 118, store the front-facing camera settings 120 and the image as the reference file 122 in the memory for future use.

The instructions to the user in FIG. 3 may be completed in any number of ways, including, but not limited to, visual instructions, text-based instructions, audio instructions, video instructions, tactile feedback and the like, as well as any combinations thereof.

Figure 4:
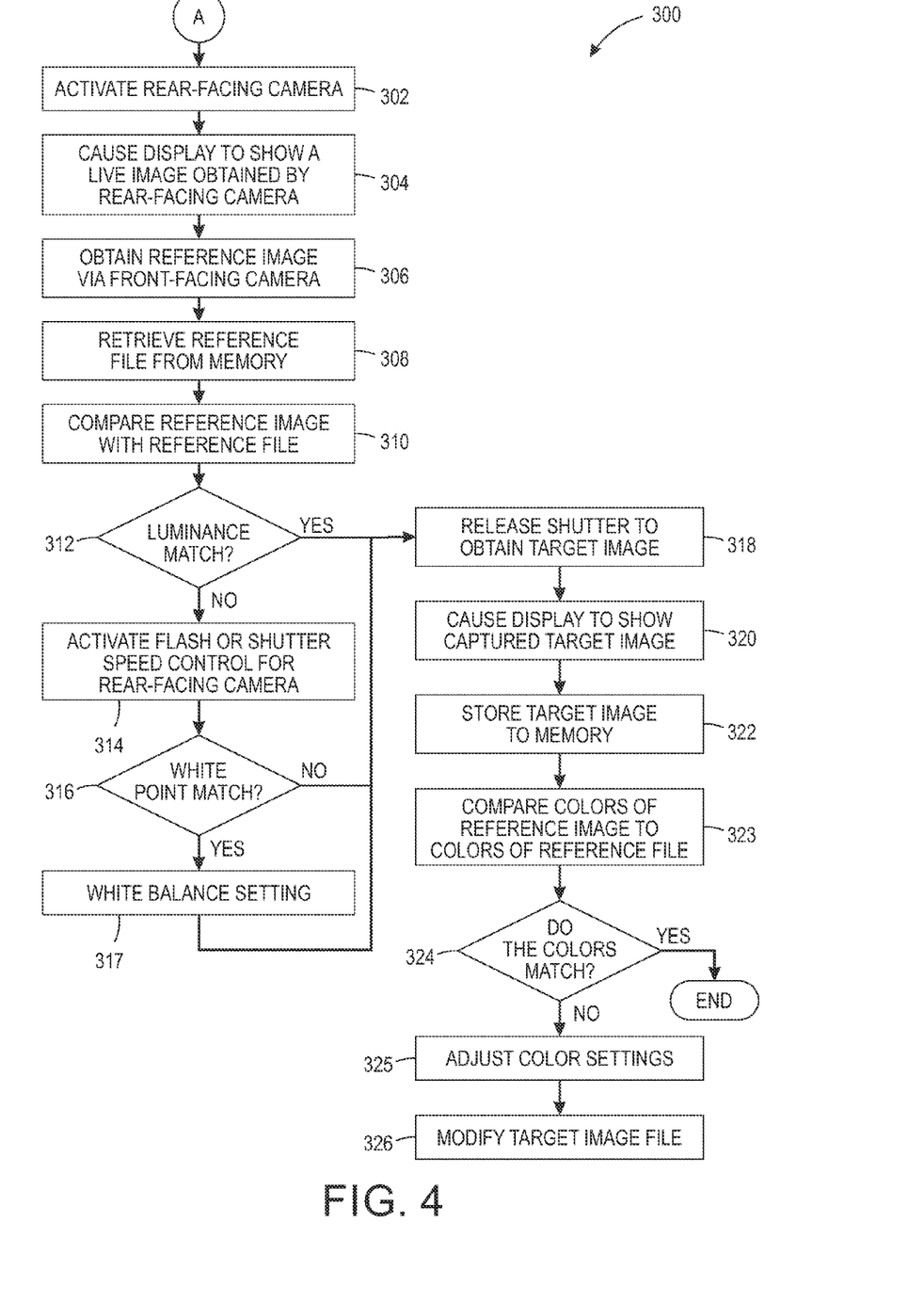
FIG. 4 is a flow chart example of a process for obtaining a color corrected target image according to an embodiment of the present disclosure.

Referring to FIG. 4, a process for obtaining a color corrected image, generally designated 300, is shown. Instructions for implementing this process may be stored as a software application within the memory, and the steps outlined below may be executed by the processor in conjunction with other components. A first step may be to activate the rear-facing camera 302 and optionally cause the display to show a live image of the object or objects in the optical field of the rear-facing camera 304. The first or front-facing camera may then capture a current (i.e., live) image of the reference object 306. The reference file may then be automatically retrieved from memory 308. A fundamental element to adjusting the white balance in color images is the sensing and estimation of illumination. One popular approach is to use a reference object with known optical properties to estimate the illumination and calibrate the device to adjust the colors accordingly. The reference can be any object; typical references include a white piece of paper or a target made of color patches, and could also be another item such as the user's face or other human body part; a driver's license, other identification card, or other document containing a color component such as a graphic printed on a substrate; an article of clothing; or any other item.

The processor may implement programming instructions that compare luminance of one or more pixels or other sections of the live image of the reference object or reference image with luminance of one or more corresponding sections of the reference file 310. Based on the result of the comparing 312, if the luminance of the reference image is not within the specified luminance range equivalent to that of the reference file, the processor may implement instructions that actuate an optical adjustment element for the second, rear-facing camera 314. The optical adjustment element will increase or decrease the luminance of an image captured by the rear-facing camera to compensate for the difference in luminance between the reference image and the reference file. Examples of such an optical adjustment element may include a photoflash, an actuator to alter shutter speed, or a combination of the two. In addition, the processor may implement instructions to analyze whether the live image matches a white point of the reference 316, and if so, it may implement a white balance setting process 317 to correct the color temperature and reduce or remove the color cast from later-captured images. This may be implemented using any now or hereafter known white balance setting processes.

If the illuminating is sufficient, or if adjustments are made as described above to compensate for illumination differences and the colors are a sufficiently close match, the processor may then cause the rear-facing camera to capture a target image 318 in response to a user input, or automatically, such as after a time period has elapsed. The target image may then be displayed 320 and stored to memory 322, as a target image file.

The processor may again compare the reference image with the reference file 323 to identify whether any significant color differences still exist 324.

If the system concludes that the colors are not a sufficiently close match, the process may implement programming instructions that transform the target image file by adjusting one or more color settings 325, and accordingly modifying the target image file 326 in the memory.

As with the processes shown in FIGS. 3 and 4, the instructions to the user may be completed in any number of ways, including, but not limited to, visual instructions, text-based instructions, audio instructions, video instructions, tactile feedback and the like, as well as any combinations thereof.

Color correction may be performed using any suitable color transformation process. The color is an integration of the illuminant, the surface property of the object, and the observer. The change in any of them usually leads to a different color perception (except for metamerism). Nevertheless, for the same observer, a white paper is usually perceived as whitish despite of a change in the illuminant from the direct sunlight in the noontime to the twilight during the sunset, for example. The perceptual ability that permits us to discount spectral variation in the ambient light and assign stable colors to objects may be referred to as color constancy. While the human visual system is able to perceive the colors of objects almost independent of illumination, digital cameras often have great difficulty with Auto White Balance (AWB), which can introduce unrealistic damaging color.

The AWB functionality can be found on many cameras, from high-end single-lens cameras (SLR) to inexpensive webcams. The complexity of the AWB algorithm and the image quality after adjustments may vary depending on the camera manufacturers and the captured scene content as well. Despite these differences, AWB generally may be implemented in two ways. The first is based on a diagonal model of illumination change, where white balance is an independent gain regulation of the three cone signals, through three different gain coefficients, as shown in Eq. 1.

$$\begin{bmatrix} L' \\ M' \\ S' \end{bmatrix} = \begin{bmatrix} k_L & 0 & 0 \\ 0 & k_M & 0 \\ 0 & 0 & k_S \end{bmatrix} \cdot \begin{bmatrix} L \\ M \\ S \end{bmatrix} \qquad (1)$$

where $$\begin{bmatrix} L \\ M \\ S \end{bmatrix}$$

are the cone signals sensitive to signals at different wavelength range. $k_L, k_M, k_S$ are the scalars to describe the change in the illuminant. Grey-world assumption (GWA) belongs to this group. The grey world assumes that given an image of sufficiently varied colors, the average surface color in a scene is gray. GWA usually works reasonably well in natural scenes, but the result may be far from satisfaction once the assumption is invalidated, under chromatic artificial lightings, for example.

Thus, white balance may be adjusted based on the reference file and the reference image of the reference object. One or more sections of each image, such as a nose or other facial features may be identified and the skin tones of each may be compared.

For example, a highlight on the user's nose may be extracted and compared. The highlight on the nose tip may be identified by the pixel of the greatest luminance. Within the cropped nose image, the pixel with the maximal luminance may be selected using the formula, $$P = R*0.3 + G*0.59 + B*0.11 \quad (2)$$

where P is the determined luminance based on the (R,G,B) values at each pixel. Scaling may be made to the target picture based on reference file and reference image by Eq. 3.

$$R'_t = \frac{R_{ref\_file}}{R_{ref\_image}} R_t \quad (3)$$

where is a red pixel in the target picture. $R_{ref\_file}$ and $R_{ref\_image}$ are the red pixels of the maximal luminance in the reference file and live image of the reference object respectively. $R'_t$ is the pixel after adjustments. Eq. 3 applies to the green and blue channels as well.

In addition to the white balancing setting, the reference information can also be used to adjust the contrast of pictures off the camera. Contrast enhancement is a process that allows image features to show up more visibly by making best use of the colors presented on the display device. Generally, contrast can be adjusted either in the spatial or in the frequency domain. The histogram equalization and sigmoid functions are among the many methods that may be used to tune the contrast in the spatial domain.

The sigmoid curve may create better contrast of human faces in the picture with little overexposure of other objects in the scene. The sigmoid function may be applied to the luminance only without affecting the chrominance channels, using the formula $$y = \frac{1}{1 + e^{-c(x-m)}} \quad (4)$$

where c is the contrast, and m is the point around which contrast is most effectively boosted. The greater the c in Eq. 4, the steeper the change in the contrast near m.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

What is claimed is:

1. A non-transitory computer-readable medium containing programming instructions that, when executed, instruct a processor of an electronic device to implement a method, wherein the electronic device includes an optical adjustment element, a first imaging device at a first face, and a second imaging device at a second face, the method comprising:
    accessing a reference file;
    causing the first imaging device to view a reference image of a reference object;
    identifying one or more differences between the reference image and the reference file;
    based on the identified one or more differences, actuating the optical adjustment element;
    causing the second imaging device to capture a target image; and
    storing the target image in a computer-readable memory of the electronic device as a target image file.

2. The non-transitory computer-readable medium containing programming instructions of claim 1, wherein the identified one or more differences comprises a luminance difference.

3. The non-transitory computer-readable medium containing programming instructions of claim 2, wherein the programming instructions to actuate the optical adjustment element comprise instructions to actuate a shutter speed adjustment or a flash.

4. The non-transitory computer-readable medium containing programming instructions of claim 1, wherein the identified one or more differences comprises a color difference.

5. The non-transitory computer-readable medium containing programming instructions of claim 4, wherein the programming instructions to actuate the optical adjustment element comprise instructions to perform a white balance setting process.

6. The non-transitory computer-readable medium containing programming instructions of claim 4, wherein the programming instructions further comprise a color transformation program that, when executed, causes the processor to apply color correction to the target image file.

7. A method of capturing a digital image, which comprises:
    by a first imaging device via a first face of an electronic device, receiving a reference image;
    by a second imaging device via a second face of the electronic device, receiving a target image;
    by a processor of the electronic device, accessing a reference file and comparing the reference file with the reference image to identify one or more differences;
    in response to the comparing, automatically actuating an optical adjustment element of the second imaging device; and
    by the second imaging device, again capturing the target image;
    by a computer-readable memory, storing the later-captured target image in a target image file.

8. The method of claim 7, wherein the reference image and the reference file each comprise an image of a document containing a color component.

9. The method of claim 7, wherein the reference image and the reference file each comprises an image of a human.

10. The method of claim 7, further comprising, by a display positioned at the second face of the electronic device, displaying the later-captured target image.

11. The method of claim 7, wherein the identified one or more differences comprises a luminance difference.

12. The method of claim 11, wherein the optical adjustment element comprises a shutter speed adjustment or a flash.

13. The method of claim 7, wherein the identified one or more differences comprises a color difference.

14. The method of claim 13, wherein the optical adjustment element comprises instructions to perform a white balance setting process before capturing the target image.

15. The method of claim 13, further comprising, by a processor, executing a color transformation program to apply color correction to the target image file to yield a modified target image file, and saving the modified target image file in the computer-readable memory or another computer-readable memory.

16. An electronic device, comprising:
    a first surface and an opposing second surface;
    a first imaging device positioned to capture an image at the first surface;
    a second imaging device positioned to capture an image at the second surface;

an optical adjustment element that relates to the second imaging device;
a processor; and
a computer-readable memory containing program instructions that are configured to, when executed, enable the processor to:
access a reference file;
cause the first imaging device to view a reference image of a reference object;
identify one or more differences between the reference image and the reference file;
actuate the optical adjustment element to compensate for the one or more differences;
cause the second imaging device to capture a target image;
store the target image in the computer-readable memory or another computer-readable memory as a target image as a target image file;
identify a difference in color between the reference image and the reference file;
apply a color correction process to the target image file to yield a modified target image file; and
store the modified target image in the computer-readable memory or another computer-readable memory.

17. The electronic device of claim 16, wherein the electronic device further comprises a display positioned to display an image at the first surface.

18. The electronic device of claim 17, wherein the program instructions, when executed, further instruct the processor to display the captured target image upon the display.

19. The electronic device of claim 16, wherein the optical adjustment element comprises a shutter speed adjustment or a flash.

20. The electronic device of claim 16, wherein the optical adjustment element comprises instructions to perform a white balance setting process before capturing the target image.

21. The electronic device of claim 16, wherein the electronic device further comprises a shutter release button, and an image capture application that may be activated by manually pressing the shutter release button.

* * * * *